(12) United States Patent
Byers et al.

(10) Patent No.: US 8,122,510 B2
(45) Date of Patent: Feb. 21, 2012

(54) METHOD FOR ANALYZING AND MANAGING UNSTRUCTURED DATA

(75) Inventors: Allan C. Byers, Charlotte, NC (US); Chad Renfro, Dallas, TX (US); Cristi Pendleton, Charlotte, NC (US); Hayes Rutter, Charlotte, NC (US); Trish Harris, Dallas, TX (US); Eric Mailloux, Christiana, DE (US); Scott Plummer, Charlotte, NC (US); Will Stranathan, Charlotte, NC (US); Rhonna Clark, Charlotte, NC (US); Raymond Fontenault, Providence, RI (US)

(73) Assignee: Bank of America Corporation, Charlotte, NC (US)

( * ) Notice: Subject to any disclaimer, the term of this patent is extended or adjusted under 35 U.S.C. 154(b) by 830 days.

(21) Appl. No.: 11/939,895

(22) Filed: Nov. 14, 2007

(65) Prior Publication Data

US 2009/0125973 A1    May 14, 2009

(51) Int. Cl.
*G06F 11/00* (2006.01)
*G06F 12/14* (2006.01)
*G06F 12/16* (2006.01)
*G08B 23/00* (2006.01)

(52) U.S. Cl. .......................................... 726/25; 726/23
(58) Field of Classification Search .................. 726/26, 726/25
See application file for complete search history.

(56) References Cited

U.S. PATENT DOCUMENTS

| | | | | |
|---|---|---|---|---|
| 7,287,280 B2 * | 10/2007 | Young | | 726/25 |
| 7,490,356 B2 * | 2/2009 | Lieblich et al. | | 726/25 |
| 7,496,964 B2 * | 2/2009 | Renfro et al. | | 726/25 |
| 7,530,110 B2 * | 5/2009 | Cheng et al. | | 726/26 |
| 7,552,480 B1 * | 6/2009 | Voss | | 726/25 |
| 7,712,137 B2 * | 5/2010 | Meier | | 726/25 |
| 7,865,958 B2 * | 1/2011 | Lieblich et al. | | 726/25 |
| 2004/0117624 A1 * | 6/2004 | Brandt et al. | | 713/166 |
| 2005/0005169 A1 * | 1/2005 | Kelekar | | 713/201 |
| 2005/0065807 A1 * | 3/2005 | DeAngelis et al. | | 705/1 |
| 2005/0278365 A1 | 12/2005 | Boucousis | | |
| 2007/0016955 A1 * | 1/2007 | Goldberg et al. | | 726/25 |
| 2007/0101436 A1 | 5/2007 | Redlich et al. | | |
| 2007/0239495 A1 | 10/2007 | Osborn et al. | | |

OTHER PUBLICATIONS

International Search Report, corresponding to International Patent Application No. PCT/US2008/83577, dated May 22, 2009.
Written Opinion, corresponding to International Patent Application No. PCT/US2008/83577, dated May 22, 2009.
International Preliminary Report on Patentability mailed May 27, 2010 for International Application No. PCT/US2008/083577.

* cited by examiner

*Primary Examiner* — Nathan Flynn
*Assistant Examiner* — Carolyn B Kosowski
(74) *Attorney, Agent, or Firm* — Moore & Van Allen PLLC; James C. Edwards

(57) ABSTRACT

A system and method for managing unstructured data that includes identifying at least one unstructured data environment with unstructured data, identifying mitigating controls in each of the unstructured data environments, the mitigating controls reducing a security risk associated with each of the unstructured data environments, and generating at least one process for managing the unstructured data in each of the unstructured data environments, the process including defining mitigating controls for managing the unstructured data in each of the unstructured data environments.

21 Claims, 9 Drawing Sheets

300

| RATING | THREATS | VULNERABILITIES | ASSET VALUE PER VOLUME |
|---|---|---|---|
| 9 | HIGH LIKELIHOOD, HIGH MAGNITUDE | EASY TO EXPLOIT WITH A HIGH MAGNITUDE | LARGE AMOUNT OF DATA PER UNIT |
| 3 | MEDIUM LIKELIHOOD, MEDIUM MAGNITUDE | AVERAGE TO EXPLOIT WITH A MEDIUM MAGNITUDE | MEDIUM AMOUNT OF DATA PER UNIT |
| 1 | LOW LIKELIHOOD, LOW MAGNITUDE | DIFFICULT TO EXPLOIT WITH A LOW MAGNITUDE | LOW AMOUNT OF DATA PER UNIT |

| SURFACES | THREATS | VULNERABILITIES | ASSET VALUE PER VOLUME | SCORE | MITIGATING CONTROLS | RESIDUAL RISK |
|---|---|---|---|---|---|---|
| ENVIRONMENT A | 9 | 9 | 9 | 729 | 1 | 729 |
| ENVIRONMENT B | 9 | 9 | 1 | 81 | 1 | 81 |
| ENVIRONMENT C | 9 | 3 | 9 | 243 | 1 | 243 |
| ENVIRONMENT D | 3 | 3 | 9 | 81 | 3 | 27 |

FIG. 4

| Unstructured Data Environment | Residual Risk Rating (This ranking comes from the Risk Quantification Formula) | Environment A | Environment B | Environment C | Environment D | Solutions | Surface Area Impact |
|---|---|---|---|---|---|---|---|
| | | High | Medium | High | Medium | | Total |
| Controls/Capabilities | Control Type & Plan | | | | | | |
| Control A | Managerial Control | S – | 1 Y | 1 Y | S – | Point Solution | 2 |
| Control B | Detective Control | 3 R | S – | 3 R | S – | Enterprise Solution | 2 |
| Control C | Preventative Control | 3 G | 3 R | 3 G | 3 R | Point Solution | 4 |
| Control D | Preventative & Detective Control | S – | 9 G | 9 G | 9 G | Deployed Enterprise Solution & Requirement | 3 |
| Controls in place today | | 2 | 3 | 4 | 2 | | |

These controls will help establish the Mitigating Controls in the Risk Quantification Formula

| Controls Scoring Legend | Scoring | Definition | Timeframe |
|---|---|---|---|
| Preventative & Detective Control (PD) | 9 | Ability to deter event and detect it occurred | Control can to be tested and implemented beyond 12 months |
| Preventative Control (P) | 3 | Deter undesirable events from occurring | Control can to be tested and implemented beyond 12 months |
| Detective Control (D) | 3 | Detect & correct undesirable events which have occurred | Control can be in place within 12 months |
| Managerial Control (M) | 1 | Policy, Vulnerability Management Assessment Recommendations, Associate Awareness | Control can be in place within 3 months |
| Not Applicable | - | The control does not fit the environment | - |

602

| Color Coding | Control |
|---|---|
| G = green | Preventative and/or Detective Control in place |
| Y = yellow | Managerial Control in place |
| R = red | No Control in place |
| S = silver | Not Applicable |

603

| Solution | Environment |
|---|---|
| Deployed Enterprise Solution & Requirement | Control is deployed throughout the entire enterprise and this solution is a required standard |
| Enterprise Solution | Control will need to be placed throughout the entire enterprise |
| Point Solution | Control can be used within the Line of Business |

FIG. 6
(continued)

METHOD FOR ANALYZING AND MANAGING UNSTRUCTURED DATA

BACKGROUND OF THE INVENTION

The present invention is related to unstructured data, and more specifically to analyzing and managing unstructured data.

Currently, with security becoming a major issue in all aspects of life, data security within companies and other enterprises is also becoming more and more important. Some data may be secure and exist in a secure environment, but then become non-secure if it is moved or copied, etc. by an individual. Unstructured data may be company owned sensitive data which has been copied, stored or moved by a person to a state where security controls could be lacking. This unstructured data may be contained on physical or digital media. Industry research shows that unstructured data is rising. With the rise in unstructured data, companies are searching for better ways to protect their employees, customers, and shareholder information. Further, there is potential risk to a company when confidential data is moved to an unstructured data environment where appropriate controls are not in place to safeguard the information in the event of loss or theft. Companies have a strong interest in preventing confidential unstructured data from leaking outside of the company without knowing where the leak came from. Access to confidential information by an unauthorized person or party may trigger a privacy event which may negatively impact the company in many different ways, e.g., regulatory compliance, land erosion, identity theft, etc.

BRIEF SUMMARY OF THE INVENTION

According to one aspect of the present invention, a method for managing unstructured data includes identifying at least one unstructured data environment with unstructured data, identifying mitigating controls in each of the unstructured data environments, the mitigating controls reducing a security risk associated with each of the unstructured data environments, and generating at least one process for managing the unstructured data in each of the unstructured data environments, the process including defining mitigating controls for managing the unstructured data in each of the unstructured data environments.

According to another aspect of the present invention, an apparatus comprises a storage medium with instructions stored therein, the instructions when executed causing a processing device to perform identifying at least one unstructured data environment with unstructured data, identifying mitigating controls in each of the unstructured data environments, the mitigating controls reducing a security risk associated with each of the unstructured data environments, and generating at least one process for managing the unstructured data in each of the unstructured data environments, the process including defining mitigating controls for managing the unstructured data in each of the unstructured data environments.

BRIEF DESCRIPTION OF THE DRAWINGS

The present invention is further described in the detailed description which follows in reference to the noted plurality of drawings by way of non-limiting examples of embodiments of the present invention in which like reference numerals represent similar parts throughout the several views of the drawings and wherein:

FIG. 3 is a diagram of a table rating threats, vulnerabilities, and asset value per volume according to an example embodiment of the present invention;

FIG. 4 is a table of information for different environments and associated residual risk according to an example embodiment of the present invention;

FIG. 6 is a diagram of a control matrix according to an example embodiment of the present invention;

DETAILED DESCRIPTION OF THE INVENTION

Figure 1:
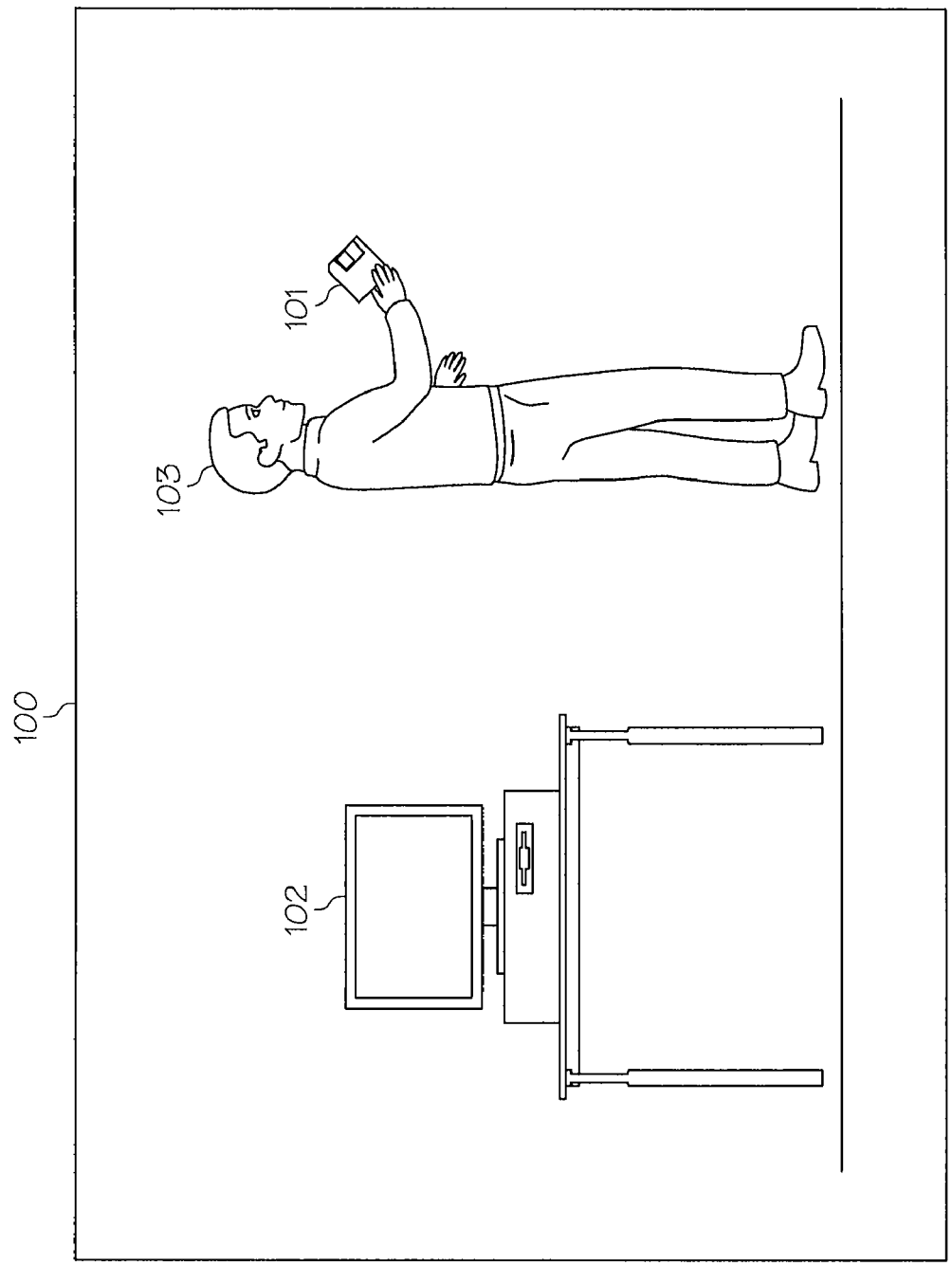
FIG. 1 is a diagram of an unstructured environment with unstructured data according to an example embodiment of the present invention.

As will be appreciated by one of skill in the art, the present invention may be embodied as a method, system, computer program product, or a combination of the foregoing. Accordingly, the present invention may take the form of an entirely hardware embodiment, an entirely software embodiment (including firmware, resident software, micro-code, etc.) or an embodiment combining software and hardware aspects that may generally be referred to herein as a "system." Furthermore, the present invention may take the form of a computer program product on a computer-usable storage medium having computer-usable program code embodied in the medium.

Any suitable computer usable or computer readable medium may be utilized. The computer usable or computer readable medium may be, for example but not limited to, an electronic, magnetic, optical, electromagnetic, infrared, or semiconductor system, apparatus, device, or propagation medium. More specific examples (a non-exhaustive list) of the computer readable medium would include the following: an electrical connection having one or more wires; a tangible medium such as a portable computer diskette, a hard disk, a random access memory (RAM), a read-only memory (ROM), an erasable programmable read-only memory (EPROM or Flash memory), a compact disc read-only memory (CD-ROM), or other tangible optical or magnetic storage device; or transmission media such as those supporting the Internet or an intranet. Note that the computer usable or computer readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

In the context of this document, a computer usable or computer readable medium may be any medium that can contain, store, communicate, propagate, or transport the program for use by or in connection with the instruction execution system, platform, apparatus, or device. The computer usable program code may be transmitted using any appropriate medium, including but not limited to the Internet, wireline, optical fiber cable, radio frequency (RF) or other means.

Computer program code for carrying out operations of the present invention may be written in an object oriented, scripted or unscripted programming language such as Java, Perl, Smalltalk, C++ or the like. However, the computer program code for carrying out operations of the present invention may also be written in conventional procedural programming languages, such as the "C" programming language or similar programming languages.

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operations to be performed on the computer or other programmable apparatus to produce a computer implemented process such that the instructions which execute on the computer or other programmable apparatus provide steps for implementing the functions/acts specified in the flowchart and/or block diagram block or blocks. Alternatively, computer program implemented steps or acts may be combined with operator or human implemented steps or acts in order to carry out an embodiment of the invention.

Embodiments according to the present invention relate to analyzing and managing unstructured data where at least one process for managing the unstructured data in an unstructured data environment is generated where the process may include defining mitigating controls for managing the unstructured data in the unstructured data environment to ensure that the security of the environment is satisfactory. An unstructured data environment containing unstructured data is identified and existing mitigating controls that reduce the security risk associated with the unstructured data environment are identified. At least one process for managing the unstructured data in the unstructured data environment is then generated where existing and/or new mitigating controls may be included in the process to ensure a desired security in the unstructured data environment. To help illustrate embodiments of the present invention, the terms "unstructured data environment", "unstructured environment" and "surface area" will be used interchangeably.

Unstructured data relates to sensitive data which has been copied, stored or moved to a state where security controls may be lacking. The sensitive data may be company owned or managed. The sensitive data may have been moved by a person, employee, or other method. The unstructured data may be contained on a physical or digital media. Unstructured data may normally be found in an unstructured environment which may also be referred to as a "surface area." Unstructured environments may have characteristics such as, for example, portability, readability, monitor ability, accessibility, etc. Portability relates to the ability of data to egress without controls, i.e., an environment with a lack of use in transport controls. Readability relates to an ability of data to be read by a computer or person, i.e., an environment with a lack of use and store controls. Monitor ability relates to an ability for content monitoring of data, i.e., an environment with a lack of use and store controls. Accessibility relates to an ability to gain access to data, i.e., an environment that lacks store controls. Therefore, an unstructured environment may be viewed as an environment that has the ability to store or transport sensitive data.

FIG. 1 shows a diagram of an unstructured environment with unstructured data according to an example embodiment of the present invention. The unstructured environment 100 includes a portable storage medium containing unstructured data 101, a computer 102, and a person 103 holding and transporting the unstructured data 101. The person 103 may have downloaded sensitive data from the computer 102 onto the portable storage medium. The person 103 may then remove the unstructured data (i.e., sensitive information) 101 from the unstructured data environment 100.

Figure 2:
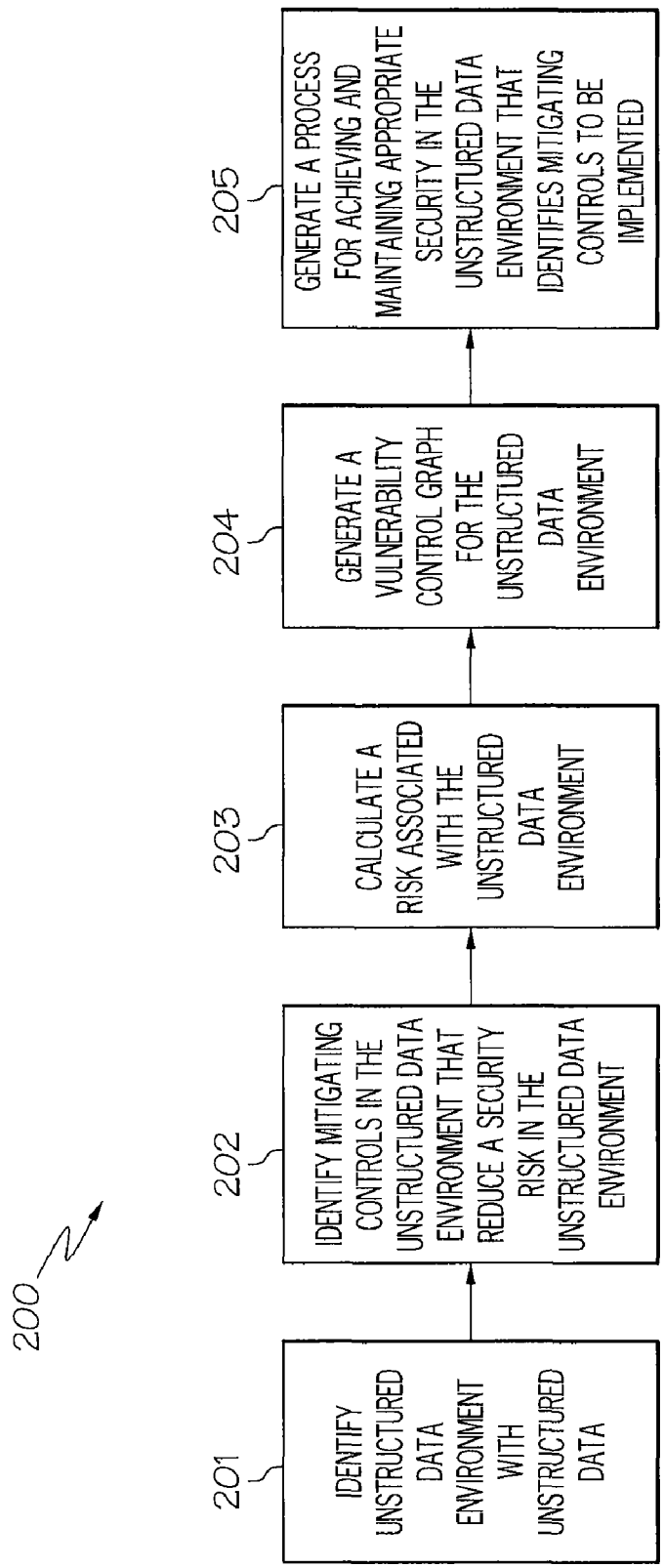
FIG. 2 is a flowchart of a process for analyzing and managing unstructured data according to an example embodiment of the present invention.

FIG. 2 shows a flowchart of a process for analyzing and managing unstructured data according to an example embodiment of the present invention. In the process 200 in block 201, an unstructured data environment with unstructured data may be identified. In block 202, mitigating controls may be identified in the unstructured data environment where a low level of these controls could produce a security risk in the unstructured data environment. In block 203, a risk associated with the unstructured data environment may be calculated. In block 204, a vulnerability control graph for the unstructured data environment may be generated. In block 205, a process may be generated for achieving and maintaining appropriate security in the unstructured data environment that identifies mitigating controls to be implemented in the unstructured data environment to maintain the appropriate security.

A company or organization may have various different groups, business units, departments, lines of businesses, etc., where each have their own unique unstructured environments and unstructured data. Therefore, processes may be generated for an unstructured data environment specific to each unique department, business unit, lines of businesses, etc. based on their specific unstructured data, unstructured environment, current and available mitigating controls, and other factors. The mitigating controls may be different in different departments, business units, lines of businesses, etc. Therefore, according to embodiments of the present invention, processes may be generated for and applied to various different unique unstructured data environments that take into consideration the unique aspects of each unstructured data environment.

To obtain data to help identify unstructured data and unstructured data environments, a survey from the line of business may be obtained to determine their processes and polices. The survey may determine the use of sensitive data in the line of business. The survey may help to locate potential areas where unstructured data can be identified and find the business case reasons that the data needs to be located in the unstructured data environment. Reviewing the policies may allow an assessment team to identify the weak points in the line of businesses policies and procedures. Recommendations for controls may be generated to enhance the policies and procedures. The controls may be tied to a policy or procedure. Once the data has been gathered and the surveys have been complete, a control matrix (discussed following) may be updated to reflect the controls that are in place for the line of business. The control matrix will show the current state of the environment.

FIG. 3 shows a diagram of a table rating threats, vulnerabilities, and asset value per volume according to an example embodiment of the present invention. According to embodiments of the present invention, a risk formula may be created that calculates a residual risk for each unstructured environment. The formula may use information related to threats, vulnerabilities, asset value per volume, and mitigating controls. To illustrate the embodiments of the present invention, these different categories may be ranked on a six sigma scale of, for example, 1, 3, and 9. As shown in the table 300, the threats may have a rating of "9" relating to a high likelihood, high magnitude, a rating of "3" relating to medium likelihood, medium magnitude, or a rating of "1" relating to low likelihood, low magnitude. Further, the vulnerabilities may have a rating of "9" related to easy to exploit with a high magnitude, a rating of "3" relating to average to exploit with a medium magnitude, or a rating of "1" relating to difficult to exploit with a low magnitude. The asset value per volume may have a rating of "9" related to large amount of data per unit, a rating of "3" relating to medium amount of data per unit, or a rating of "1" relating to low amount of data per unit.

Mitigating controls generally relate to controls that are in place currently in each environment. However, mitigating controls may also be added to an environment. To illustrate embodiments of the present invention, the mitigating controls may be ranked anywhere from values 1 through 9. A primary individual risk score may be calculated by multiplying the threat rating by the vulnerabilities rating and by the asset value per volume rating for a specific unstructured data environment. A residual risk for a particular unstructured environment may be calculated by taking the primary individual risk score and dividing this value by the mitigating controls ranking.

FIG. 4 shows a table of information for different environments and associated residual risk according to an example embodiment of the present invention. The table 400 illustrates details related to four different unstructured environments A, B, C, D (Surfaces), and rankings for threats, vulnerabilities, asset value per volume associated with each of these environments. Further, for each environment, a primary individual risk score (Score), mitigating control ranking, and resultant residual risk scores are shown. In this example embodiment, the residual risk ranking may be based on a scoring chart of: "high" from 729 to 243, "medium" from 81 to 27, and "low" from 9 to 1. This ranking may be uniformly used to build conformity to the process of ranking different items based on a scale of high, medium, and low. As shown in the table 400, Environment A has a threat rating of 9, vulnerability rating of 9, and asset value per volume rating of 9, resulting in a primary risk score of 729, and with a mitigating control rating 1 resulting in a residual risk score of 729.

Environment B has a threat rating of 9, vulnerabilities rating of 9, asset value per volume rating of 1 resulting in a primary score of 81, and has a mitigating control rating of 1 resulting in a residual risk score of 81. Further, Environment C has a threat rating of 9, vulnerabilities rating of 3, asset value per volume rating of 9 resulting in a primary score of 243, and has a mitigating control rating of 1 resulting in a residual risk score of 243. Finally, Environment D has a threat rating of 3, vulnerabilities rating of 3, asset value per volume rating of 9 in a primary score of 81, and has a mitigating control rating of 3 resulting in a residual risk score of 27.

Figure 5:
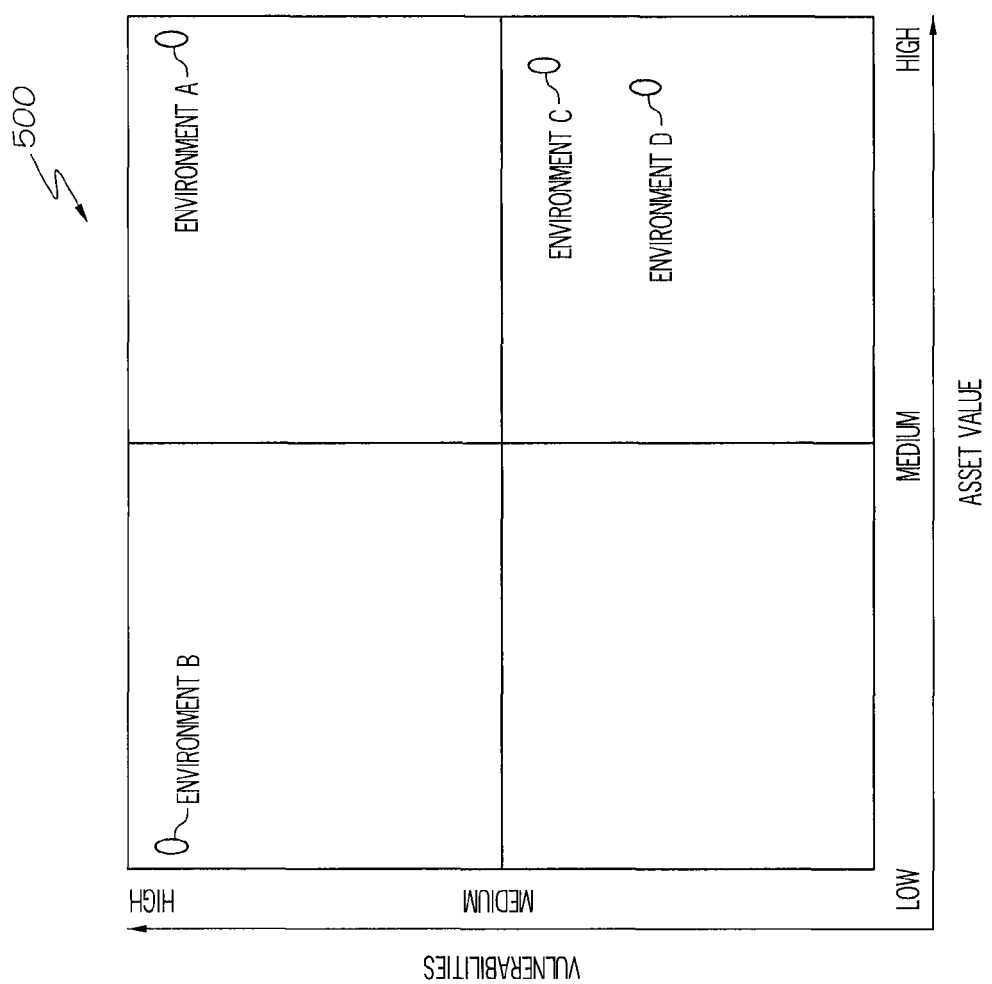
FIG. 5 is a diagram of a risk quadrant according to an example embodiment of the present invention.

FIG. 5 shows a diagram of a risk quadrant according to an example embodiment of the present invention. The risk quadrant 500 tracks each environment's vulnerabilities and asset values enabling a particular line of business, related to the unstructured environment, to understand which unstructured environments have the greatest risk. The risk quadrant 500 may be based on the risk formula. The risk quadrant 500 may have a vertical axis related to vulnerabilities and a horizontal axis related to asset value. The vulnerabilities axis may start from "low" and increase up vertically to "medium" and up to "high". Similarly, the asset value may start at "low" increase to the right horizontally to "medium" and to "high". Therefore, the risk quadrant 500 in this example embodiment shows four different quadrants related to vulnerabilities ranging from "low" to "high" and asset values ranging from "low to high".

As shown in the risk quadrant 500, Environment A having a vulnerabilities rating of 9 and asset value rating of 9 is shown as a mark in the upper-right quadrant denoting high vulnerabilities and high asset value. Further, Environment B with a vulnerabilities rating of 9 and an asset value rating of 1 is shown as a mark in a top-left quadrant related to a vulnerabilities being high and asset value being low. Environment C is shown as a mark in a lower-right quadrant having a vulnerabilities rating of 3 and asset value rating of 9 denoting a vulnerabilities of medium and asset value of high. Similarly, Environment D with a vulnerabilities rating of 3 and an asset value rating of 9 is shown in a bottom-right quadrant reflecting a vulnerabilities of less than medium and an asset value of high.

FIG. 6 shows a diagram of a control matrix according to an example embodiment of the present invention. According to embodiments of the present invention, a control matrix may be created that encompasses all the controls that could increase the security and counter measures in the risk formula and help to lower the residual risk. A control matrix 600 may contain a number of controls that allow the different lines of business (or other company groupings) to understand all the different types of controls that may help securely protect each unstructured data environment. These controls, as will be shown following, may help to build a playbook for the line of businesses' unstructured data environment that may incorporate the controls over the course of a period of time. This allows different lines of businesses, or other corporate groups, to know where the controls fit into their tactical and strategic planning.

In the control matrix 600 in row 2 (after the title), the unstructured data environments are listed (i.e., Environment A, Environment B, Environment C, Environment D). In row three, a residual risk rating for each environment is listed based on the risk formula (e.g., low, medium, high). Column 1 lists Controls/Capabilities and lists all controls that are or could be in place in each of the unstructured environments. This provides a view of all the different types of controls in an environment. The second column shows Control Type $ Plan and in this example embodiment, lists four distinct control types: Managerial, Detective, Preventive, and Preventive and Detective.

Also shown in FIG. 6 are three tables 601, 602,603 that provide further details regarding information in the control matrix 600. For example, table 601 shows further details regarding the managerial control, detective control, preventive control, and preventive and detective control shown under the Control Type $ Plan column in the Control Matrix 600. A score, definition, and estimated time frame for implementation of the specific control are shown in table 601.

Managerial Controls may be Policy, Vulnerability Management Assessment Recommendations, and Associate Awareness driven.

A control matrix 600 according to embodiments of the present invention may also include a timeframe for implementation into the unstructured data environment. In this example embodiment, these controls are shown as being in place within 3 months. Detective Controls may provide an ability to detect and correct undesirable events which have occurred. In this example embodiment, these controls are shown as being in place within 12 months. Preventative Controls may provide an ability to deter undesirable events from occurring. These controls may take a large amount of time to enforce based on the technology and deployment, which means they may be very strategic tools that may take longer (e.g., longer than 12 months) to deploy. Preventative $ Detective Controls may provide an ability to deter the event from occurring and detect at the same time in order to have a record of the event. These controls may take a large amount of time to enforce based on the technology and deployment, which means they may be very strategic tools that take longer (e.g., longer than 12 months) to deploy. The preventive and detective control (PD) has a score of 9, the preventive control (PD) has a score of 3, the detective control (D) has a score of 3, and the managerial control (M) has a score of 1. There may also be a "non-applicable" listed under the controls scoring legend which has no score and may be defined as "the control does not fit the environment."

In this example embodiment, in the control matrix 600, in columns 3-6 and starting at rows 5-8 a heat map may exist that may be designed to show which controls can be in place for each environment. This provides an easy visual view of the environments and controls in place. Colors in the heat map are represented by letter characters, (G) for green, (R) for red, (Y) for yellow, and (S) for silver. These colors are for illustration and to do limit embodiments according to the present invention as any colors may be used and be within the scope of the present invention. Example six sigma numbers (shown in table 601) used to illustrate and score each control may include Preventative $ Detective Control (PD) may equal to 9, Preventative Control (P) may equal to 3, Detective Control (D) may equal to 3, Managerial Control (M) may equal to 1, Controls that are not applicable for the environment may be labeled with a "–" sign.

Table 602 shows various colors for the color coding that may be shown in the heat map portion of the control matrix 600. As shown in table 601, in this example embodiment, the color Green (G) may indicate that the Preventative and/or Detective Control is in place for the environment, the color Yellow (Y) may indicate the Managerial Control is in place for the environment, the color Red may indicate the control is not in place for the environment, and the color grey may indicate that the control is not applicable for the environment.

In the control matrix 600, in column G shows Solutions that may be used to relate the type of solution each control represents. Table 603 shows details regarding the environment that the solution may be applied to from the solutions shown in the control matrix 600. For example, a Point Solution may suggest the control can be used within the Line of Business, an Enterprise Solution may suggest the control will need to be placed throughout the entire enterprise, and a Deployed Enterprise Solution $ Requirement may suggest the control may be deployed throughout the entire enterprise and this solution is a required standard.

In the control matrix 600, in column H shows Surface Area (i.e., environment) Impact that may show the number of times each control is used in the environment. The controls may be quantified by the impact they have on the total amount of environments. In the control matrix 600, in row 10, Controls in place today, the environments may show the amount of controls in place today. This correlates to the Mitigating Controls in the Risk Quantification.

Figure 7:
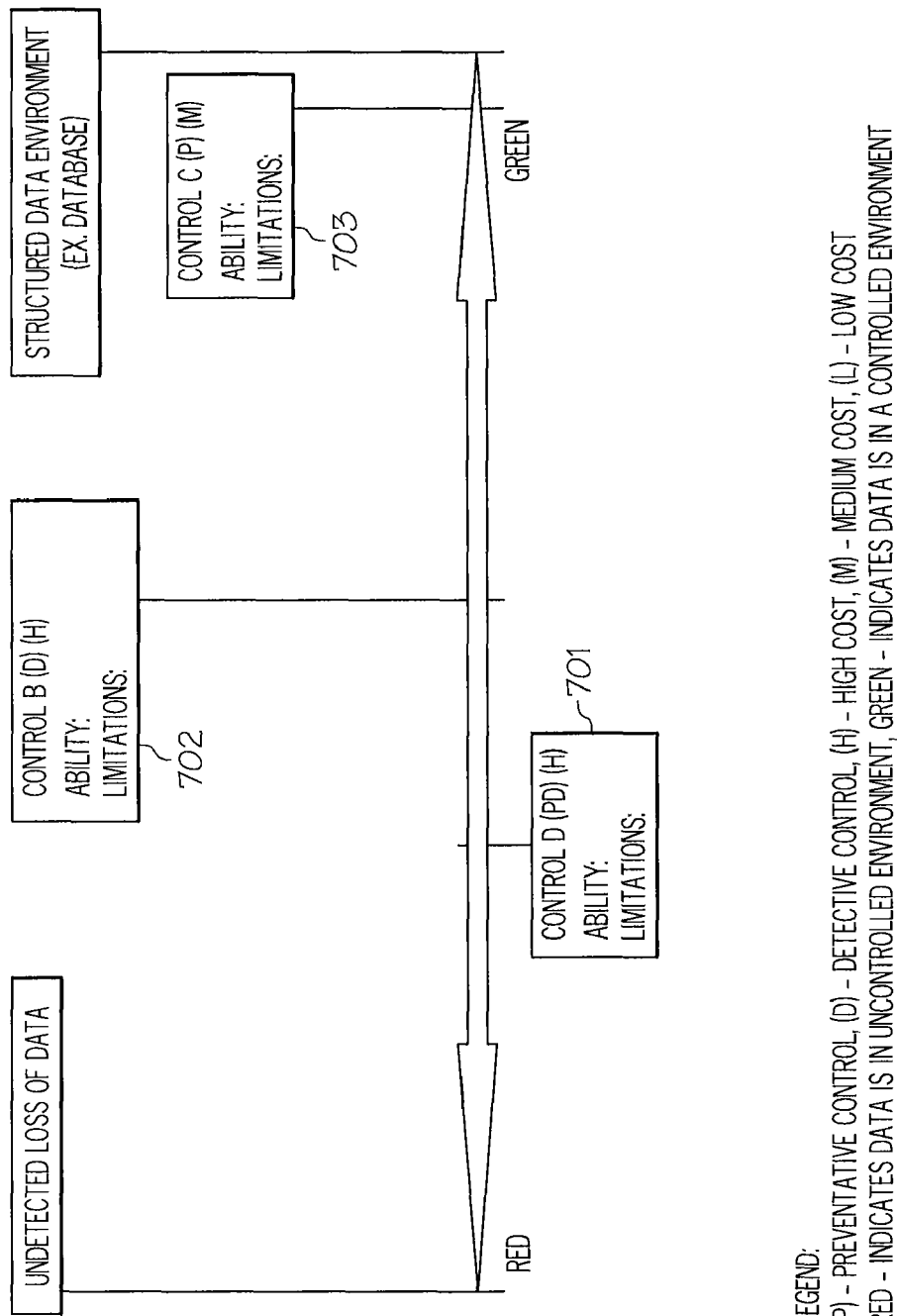
FIG. 7 is a diagram of control meter according to an example embodiment of the present invention.

FIG. 7 shows a diagram of control meter according to an example embodiment of the present invention. The control meter 700 may be used to identify where the controls 701, 702, 703 on the control matrix fit into the spectrum between Unstructured Data that is not protected and a Structured Environment. The control meter 700 may be based on a spectrum of the worst possible scenario being colored in one color (e.g., red) on the far left and labeled as Undetected Loss of Data and the most secure method colored in a second color (e.g., green) on the far right and labeled Structured Data Environment (e.g., a database). Each control 701, 702, 703 from the control matrix 600 may be placed in the control meter spectrum. The location of the controls in the control meter 700 may be based on a number of criteria, for example, the size of the environment, the impact on the environment, the amount of data loss, etc. Each control meter 700 may provide a path for a line of business that they may need to follow in order to securely protect their unstructured data environments and provide the line of business more secure environments. A control meter 700 may be applied to different types of environments according to embodiments of the present invention.

Each control 701, 702, 703 may have associated "abilities" and "limitations" listed along with the control 701, 702, 703 in the control meter 700. This provides a high level overview of each control 701, 702, 703 so each Line of Business can clearly understand how the control 701, 702, 703 may protect the associated environment and the deficiencies of the control 701, 702, 703. The "abilities" and "limitations" for each control 701, 702, 703 may be based on how the control is used in the environment. There may be a control meter for each unstructured data environment.

The "control", "ability" related to the control, and "limitations" related to the control, may be specific to the type of the control as well as the specific environment where the control may be implemented. Each control 701, 702, 703 may be labeled (e.g., here with letters) that correspond back to the control matrix 600. As an example, assuming that the Environment C is a removable media environment where a removable media (e.g., compact disc) may contain sensitive data that has been copied and removed from a personal computer. Control B 702 as shown in the figure may be a detective control (D) having a high (H) residual risk rating, where the control may be, for example, "M point host monitoring (monitoring)" control. The "ability" associated with the control B 702 may be "monitor all data on the computer even when the computer is not on the internal network," and the "limitations" associated with the control B 702 may be "the need for resources to monitor and analyze the reports from the tool."

In another example, Control D 701 shown as a preventive and detective control (PD) with a high (H) residual risk, may represent "N point host monitoring (locking and monitoring)" type control where the "ability" associated with the control D 701 may be "block an monitor all data on the computer even when the computer is not on the internal network," and the "limitations" associated with the control D 701 may be "the high rate of false positives in the blocking capability could cause an impact to the business." Similarly, Control C 703 may represent a particular type of control with associated residual risk rating, ability, and limitations.

A dollar cost for implementing each control in an unstructured data environment may be determined. The cost for a control may be based on many factors, for example, the impact the control may have, the size of the environment, how the control is being used in the environment, etc. As shown in the control meter 700, letters H, M, and L have been used to denote general cost ranges. For example, a High Cost (H) may be based on the fact that it may cost over 2 million dollars to implement the solution in the environment, a Medium Cost (M) may be based on the fact that it may cost between 500,000-1.9 million dollars to implement the solution in the environment, and a Low Cost (L) may be based on the fact that it may cost less than 500,000 dollars to implement the solution in the environment.

Information from the risk formula, risk quadrant 500, control matrix 600, cost for each control, and possibly other information may be fed into a control accelerometer. The control accelerometer may build a Vulnerability Management Control Playbook Scorecard graph ("control playbook") using all of this information where the graph level sets the current environment. Upon review of the control playbook, controls may be removed and/or added from the control matrix 600 and a new control playbook generated to determine how to build tactical and strategic plans for increasing security in a particular environment. Therefore, different controls can be mixed and matched for a particular environment and then a resultant control playbook used to assess their impact on increasing security in a particular environment. As noted previously, the implementation of a specific control in an environment may have an associated dollar cost associated with it. The dollar amount associated with a particular control may be determined from any of many different factors for example, the impact it may have on the environment, the size of the environment, how the control is being used, etc.

Figure 8:
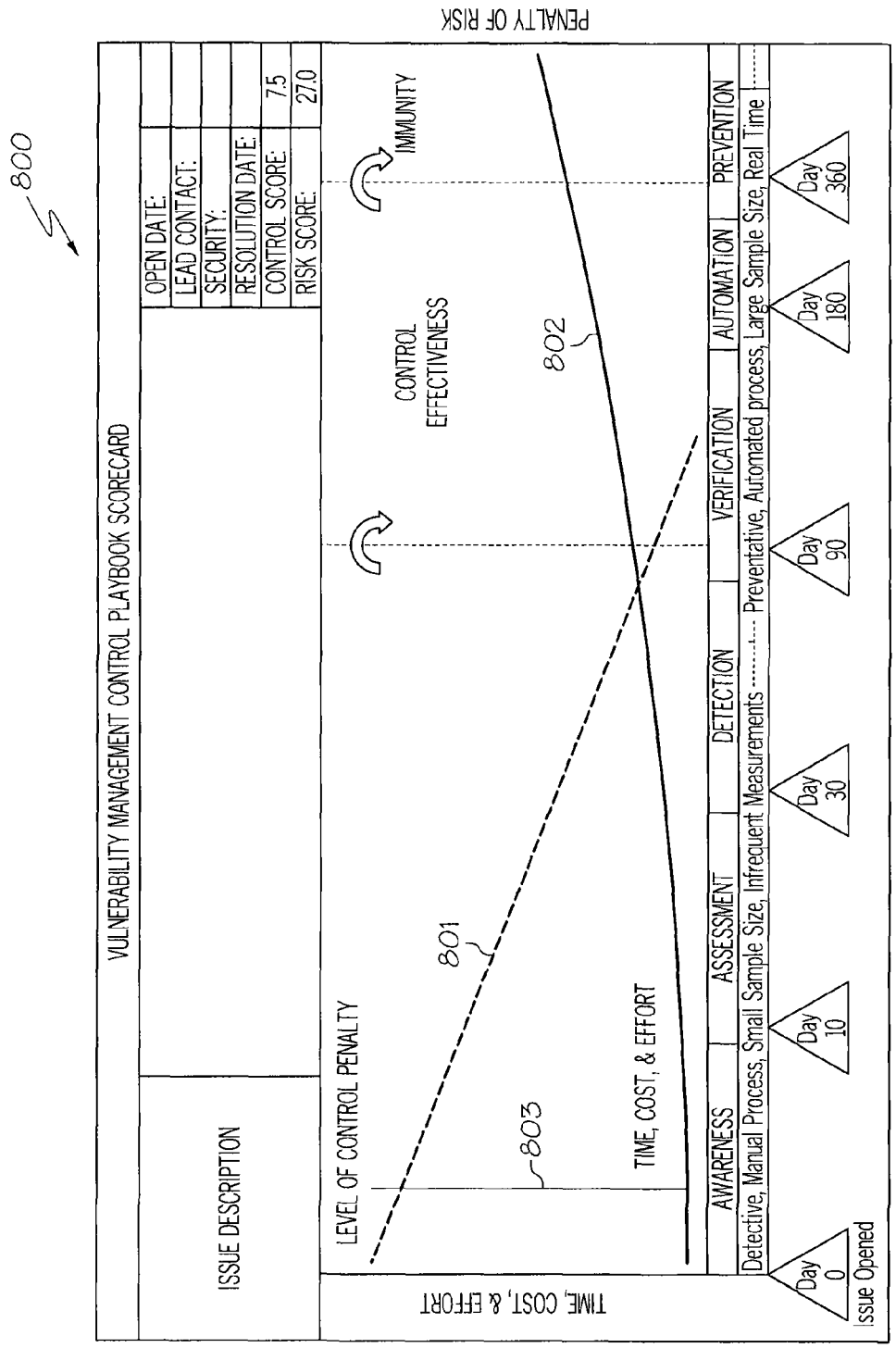
FIG. 8 is a diagram of a Vulnerability Management Control Playbook Scorecard graph according to an example embodiment of the present invention.

FIG. 8 shows a diagram of a Vulnerability Management Control Playbook Scorecard graph according to an example embodiment of the present invention. The control playbook graph 800 represents an output from the control accelerator. The control playbook graph 800 may have a left-most side representing low time, cost and effort and high level of risk, and a right-most side that represents high time, cost and effort and low level of risk. A first curve 801 in the control playbook graph 800 may show a level of risk or penalty and a second curve 802 in the control playbook graph 800 may show a time, cost and effort. The vertical line 803 depicts the level of security for this unsecured data environment based on the mitigating controls as it relates to the first curve 801 and the second curve 802. Since in this example embodiment, the security level line 803 is to the left side of the control playbook graph 800, this may denote a low time, cost and effort and high level of risk, thus a lower level of security in the environment.

To improve the position of the security level line 803 by trying to move it to the right, other mitigating controls may be added and/or existing mitigating controls removed and a new control matrix, new control meter formulation process rerun and a resultant new control playbook graph generated from the control accelerometer. The new control playbook graph may then be reviewed to determine if the additional/modified mitigating controls have moved the security level line 803 further to the right along the horizontal axis of the control playbook graph 800 thus increasing the level of security in the unstructured data environment. Preferably, it may be desired to add, delete or otherwise modify the mitigating controls such that the security level line 803 moves further to the right in the control playbook graph 800 along the horizontal axis closer to the point where the level of risk or penalty curve 801 and the time, cost and effort curve 802 intersect. This point may represent a good balance between decreasing the level of risk or penalty in the environment while controlling increases in time, cost and effort in the environment.

The environment may then be monitored to verify the controls are effectively reducing the residual risk in the associated unstructured data environment. Based on an initial version of the control matrix 600, the control playbook graph 800 may show a progression of changes that occur and how they affect the control matrix 600. The control matrix 600 may reflect the new enhancements, which will increase the mitigating controls on the risk quantification and lower the residual risk of each environment. The control accelerometer may track the increase in controls for each environment and show how the effectiveness of the control is affecting the environment. An assessment team may come back to the line of business over a period of time (e.g., 6-12 months) to determine whether to re-assess the unstructured data environments. At this time new recommendations may be made to the previously assessed unstructured data environments or a new scope may be defined.

Figure 9:
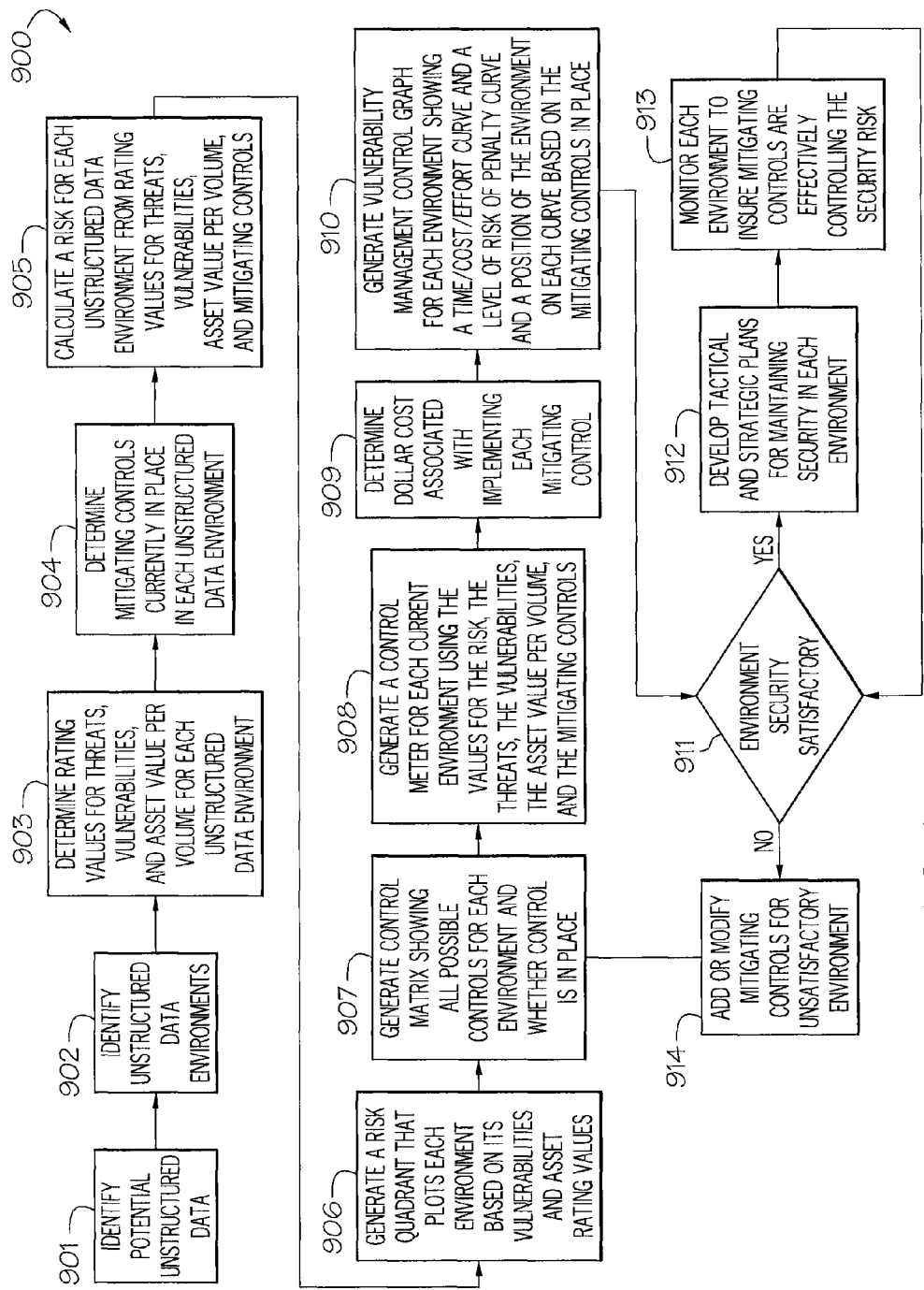
FIG. 9 is a flowchart of a process for analyzing and managing unstructured data according to another example embodiment of the present invention.

FIG. 9 shows a flowchart of a process for analyzing and managing unstructured data according to another example embodiment of the present invention. In the process 900, in block 901, potential unstructured data may be identified. In block 902, unstructured data environments containing the unstructured data may be identified. In block 903, rating values may be determined for threats, vulnerabilities, and asset value per volume for each unstructured data environment. In block 904, mitigating controls currently in place in each unstructured data environment may be determined. In block 905, a risk may be calculated for each unstructured data environment from rating values for threats, vulnerabilities, asset value per volume, and mitigating controls. In block 906, a risk quadrant may be generated that plots each environment based on its vulnerabilities and asset rating values. In block 907, a control matrix may be generated showing all possible controls for each environment and whether the control is in place. In block 908, a control meter may be generated for each current environment using the values for the risk, the threats, the vulnerabilities, the asset value per volume, and the mitigating controls. In block 909, a dollar cost may be determined that is associated with implementing each mitigating control in each environment. In block 910, a vulnerability management control playbook scorecard graph may be generated for each environment showing a time/cost/effort curve and a level of risk of penalty curve and a position of the environment on each curve based on the mitigating controls currently or expected to be in place. Initially, this process may occur with mitigating controls currently in place. However, if it is determined that these controls are not satisfactory, currently in place controls may be removed or modified and/or new controls added to the unstructured data environment to improve security.

In block 911, it may be determined if the environment security is satisfactory, and if so, in block 912, a tactical and strategic plan may be developed for each environment for maintaining security in each environment. Then in block 913, each environment may be monitored to ensure the mitigated controls are effectively controlling the security risk, and the process return to block 911. If it is determined in block 911 that the environment security is not satisfactory, in block 914, mitigating controls may be added or modified for each unsatisfactory environment, and the process return to block 907 where a new control matrix may be generated reflecting the modified mitigating controls and the process proceed from there.

The flowcharts and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Although specific embodiments have been illustrated and described herein, those of ordinary skill in the art appreciate that any arrangement which is calculated to achieve the same purpose may be substituted for the specific embodiments shown and that the invention has other applications in other environments. This application is intended to cover any adaptations or variations of the present invention. The following claims are in no way intended to limit the scope of the invention to the specific embodiments described herein.

What is claimed is:

1. A method for managing unstructured data comprising:
   identifying an unstructured data environment that includes unstructured data, wherein the unstructured data environment is defined by a surface area that includes the ability to store the unstructured data on a portable storage medium and remove the portable storage medium from the unstructured data environment;
   receiving, via a computing device processor, a threat rating, a vulnerabilities rating and an asset value per volume rating, each rating associated with the unstructured data environment;
   determining, via a computing device, a risk score for the unstructured data environment based on the threat rating, the vulnerability rating and the asset value per volume rating; and
   generating, via a computing device, a risk quadrant chart having a first axis representing the vulnerabilities rating and a second axis representing the asset value per volume rating, wherein the unstructured data environment is plotted in a quadrant of the risk quadrant chart based on the vulnerabilities rating and the asset value per volume rating.

2. The method according to claim 1, wherein the unstructured data further comprises at least one of internally owned sensitive data, data that has been copied, data that has been stored, data that has been moved, or data in a state or environment lacking security.

3. The method according to claim 1, further comprising receiving, via a computing device processor, a mitigating control ranking associated with the unstructured data environment and determining, via a computing device processor, a residual risk score for the unstructured data environment based on the risk score and the mitigating control ranking.

4. The method according to claim 1, wherein determining the risk score further comprises multiplying, via a computing device processor, the threat rating, a the vulnerabilities rating, and the asset value per volume rating.

5. The method according to claim 3, wherein determining the residual risk score further comprises dividing, via a computing device processor, the risk score by the mitigating controls ranking.

6. The method according to claim 3, further comprising ranking, via a computing device processor, the unstructured data environment in comparison to other unstructured data environments based on the risk score and residual risk score.

7. The method according to claim 1, further comprising generating, via a computing device processor, a control matrix for the unstructured data environment comprising one or more mitigating controls associated with the unstructured data environment and a current control status for each mitigating control.

8. The method according to claim 7, further comprising generating, via computing device processor, a control meter for the unstructured data environment, the control meter comprising a spectrum from undetected loss of data to the structured data environment, a mark for each mitigating control in the unstructured data environment, each control meter being useable to identify mitigating controls providing an acceptable security level of protection of unstructured data in the unstructured data environment.

9. The method according to claim 8, further comprising using information from the risk quadrant chart, the control matrix, and the control meter to generate at least one process for managing the unstructured data in the unstructured data environment, the process including defining mitigating controls for managing the unstructured data in the unstructured data environment.

10. The method according to claim 9, further comprising generating, via a computing device processor, a management control graph for the environment showing a time/cost/effort curve, a level of risk of penalty curve, and a security position of the unstructured data environment on each curve based on the mitigating controls in place in the unstructured data environment.

11. The method according to claim 10, further comprising generating the management control graph using a dollar cost for each mitigating control.

12. The method according to claim 10, further comprising performing at least one of adding at least one new mitigating control or modifying the mitigating controls to improve the security position of the unstructured data environment on the time/cost/effort curve and the level of risk of penalty curve.

13. The method according to claim 10, further comprising developing at least one plan for maintaining unstructured data security in the unstructured data environment.

14. The method according to claim 10, further comprising monitoring the unstructured data environment to insure the mitigating controls are effectively controlling the security risk.

15. An apparatus comprising:
   a computing processing device; and
   a non-transitory storage medium with instructions stored therein, the instructions when executed causing the computing processing device to perform;

receiving a threat rating, a vulnerabilities rating and an asset value per volume rating, each rating associated with an identified unstructured data environment, wherein the unstructured data environment is defined by a surface area that includes the ability to store unstructured data on a portable storage medium and remove the portable storage medium from the unstructured data environment;

determining a risk score for the unstructured data environment based on the threat rating, the vulnerability rating and the asset value per volume rating; and generating a risk quadrant chart having a first axis representing the vulnerabilities rating and a second axis representing the asset value per volume rating, wherein the unstructured data environment is plotted in a quadrant of the risk quadrant chart based on the vulnerabilities rating and the asset value per volume rating.

16. The apparatus according to claim 15, wherein the unstructured data further comprises at least one of internally owned sensitive data, data that has been copied, data that has been stored, data that has been moved, or data in a state or environment lacking security.

17. The apparatus according to claim 15, wherein the instructions when executed further cause the computing processing device to perform determining a residual risk score for the unstructured data environment based on the risk score and a mitigating control ranking.

18. The apparatus according to claim 15, wherein the instructions when executed further cause the computing processing device to perform generating a control matrix for the unstructured data environment comprising one or more mitigating controls associated with the unstructured data environment and a current control status for each mitigating control.

19. The apparatus according to claim 18, wherein the instructions when executed further cause the computing processing device to perform generating a control meter for the unstructured data environment, the control meter comprising a spectrum from undetected loss of data to structured data environment, a mark for each mitigating control in the unstructured data environment, each control meter being useable to identify mitigating controls providing an acceptable security level of protection of unstructured data in the unstructured data environment.

20. The apparatus according to claim 19, wherein information from the risk quadrant chart, the control matrix, and the control meter to generate at least one process for managing the unstructured data in the unstructured data environment, the process including defining mitigating controls for managing the unstructured data in the unstructured data environment.

21. The apparatus according to claim 20, wherein the instructions when executed further cause the computing processing device to perform generating a management control graph for the environment showing a time/cost/effort curve, a level of risk of penalty curve, and a security position of the unstructured data environment on each curve based on the mitigating controls in place in the unstructured data environment.

* * * * *